United States Patent [19]
Shido

[11] Patent Number: 5,978,326
[45] Date of Patent: *Nov. 2, 1999

[54] INFORMATION PROCESSING APPARATUS USING AN OFFSET SIGNAL TO CONTROL THE POSITION OF A PROBE

[75] Inventor: Shunichi Shido, Sagamihara, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/565,897

[22] Filed: Dec. 1, 1995

[30] Foreign Application Priority Data

Dec. 5, 1994 [JP] Japan .................................. 6-329891
Aug. 4, 1995 [JP] Japan .................................. 7-219502

[51] Int. Cl.⁶ .................................................. G11B 7/095
[52] U.S. Cl. .................................. 369/44.26; 369/44.29; 369/126
[58] Field of Search ...................... 369/44.25, 44.26, 369/44.28, 44.29, 44.35, 47–48, 50, 53, 54, 58, 101, 126

[56] References Cited

U.S. PATENT DOCUMENTS

| 5,177,726 | 1/1993 | Terada | 369/54 X |
| 5,247,165 | 9/1993 | Hiruta et al. | |
| 5,282,191 | 1/1994 | Yamano et al. | 369/126 |
| 5,299,184 | 3/1994 | Yamano et al. | 369/44.28 |
| 5,432,771 | 7/1995 | Shido et al. | 369/126 |
| 5,461,605 | 10/1995 | Takimoto et al. | 369/126 |
| 5,526,334 | 6/1996 | Yamano et al. | 369/44.26 X |

FOREIGN PATENT DOCUMENTS

| 0338083 | 10/1989 | European Pat. Off. |
| 61-80536 | 4/1986 | Japan |
| 62-281138 | 12/1987 | Japan |
| 63-161552 | 7/1988 | Japan |
| 63-161553 | 7/1988 | Japan |
| 1-133239 | 5/1989 | Japan |
| 1-233303 | 9/1989 | Japan |
| 5-342647 | 12/1993 | Japan |

OTHER PUBLICATIONS

Patent Abstracts of Japan, vol. 13, No. 382 (P–923) [3730], Aug. 24, 1989 & JP–A–01 133239.
Patent Abstracts of Japan, vol. 013, No. 557 (P–974), Dec. 12, 1989 & JP–A–01 233303.
Patent Abstracts of Japan, vol. 018, No. 184 (P–1719) Mar. 29, 1994 & JP–A–05 342647.

*Primary Examiner*—W. R. Young
*Attorney, Agent, or Firm*—Fitzpatrick, Cella, Harper & Scinto

[57] ABSTRACT

An information processing apparatus, which utilizes a physical phenomenon occurring between a probe and a sample to detect information from the sample, includes a device for moving the probe in order to adjust a clearance between the probe and the sample, a device for detecting a physical phenomenon occurring between the probe and the sample, a device for generating a control signal for the moving device to change the clearance between the probe and the sample to a desired clearance, based on a result of detection of the detecting device, and a device for applying an offset signal to the control signal in order that the probe can move with respect to a reference located at a position deviated from a center position of a movable range of the probe by means of the moving device.

12 Claims, 6 Drawing Sheets

INFORMATION PROCESSING APPARATUS USING AN OFFSET SIGNAL TO CONTROL THE POSITION OF A PROBE

BACKGROUND OF THE INVENTION

1. Field of the Invention

The present invention relates to an information processing apparatus utilizing a physical phenomenon (a tunneling current, evanescent light, etc.) occurring when a probe is brought into proximity to a sample, and more particularly to a probe position controlling mechanism for controlling a distance between the probe and the sample.

2. Related Background Art

Recently, applications of memory materials are central to electronics industries including computers and associated equipment, video disks, digital audio disks, etc., and material development is in progress very actively.

Although performance required from the memory materials differs depending upon applications, a quick response speed of recording or reproduction is necessary and indispensable.

The majority of conventional memories were semiconductor memories and magnetic memories made of semiconductor materials or magnetic materials, but, with recent progress in the laser technology, cheap and high-density recording media are coming along as optical memories using an organic thin film of an organic dye, a photopolymer, or the like.

Developed these years on the other hand is a scanning tunneling microscope (hereinafter referred to as STM), which can directly observe electronic structures of surface atoms in a conductor [G. Binnig et al., Phys. Rev. Lett, 49, 57 (1982)]. The STM permits high-resolution measurement of real aerial image, irrespective of whether an object is of a single crystal or amorphous. In addition, the STM has an advantage that it can measure a sample at low power without damaging the sample by an electric current. Further, it can operate in the air, and can be used for a variety of materials. Therefore, a wide range of applications are expected for the STM.

The STM utilizes the phenomenon that a tunneling current flows when a metal probe (probe electrode) is brought to the distance of about 1 nm to an electrically conductive substance as applying a voltage between the probe and the conductive substance.

This current is very sensitive because it exponentially responds to a change in the distance between the probe and the substance.

When the substance is scanned with the probe while keeping the tunneling current constant, various information even concerning a total electron cloud in the real space can be read.

The resolution in in-plane directions by this is about 0.1 nm, and, therefore, applying the principles of STM makes high-density recording and/or reproduction possible substantially in the atomic order (the sub-nanometer order).

For example, the information processing apparatus as disclosed in the gazette of Japanese Laid-open Patent Application No. 61-80536 is arranged to remove atomic particles adsorbed on the surface of a medium with an electron beam or the like so as to write information and to reproduce the data with the STM.

Another method is also proposed in such an arrangement that a recording layer is made of a material having the memory effect for switching characteristics of voltage or current, for example a thin-film layer of one out of organic compounds having the conjugated $\pi$ electron system or chalcogenides and the STM is used to perform recording and/or reproduction [Japanese Laid-open Patent Applications No. 63-161552 and No. 63-161553].

Supposing the bit size of recording is 10 nm, this method enables large-capacity recording and/or reproduction of 1 Tbits/cm.

Further, a scanning mechanism of the probe electrode is one of a cantilever type (Japanese Laid-open Patent Application No. 62-281138). A plurality of cantilever mechanisms can be made of $SiO_2$ in the size approximately of 100 $\mu$m in length, 10 to 20 $\mu$m in width, and 0.5 $\mu$m in thickness on a silicon substrate, and writing and reading circuits are also integrated on the same substrate.

As apparent from such principles of STM, angstrom-level control is necessary for position control of probe in order to measure a surface structure of substance by the STM.

For that purpose, there have been developed actuators for control, such as those utilizing a piezoelectric device or those utilizing an electrostatic force. A cylinder type device or layer-built type device may be used as a device that utilizes a piezoelectric device. Further, there may be also used a lever type device such as a bimorph cantilever which includes a cantilever in which two layers of piezoelectric members and an electrode are alternately laminated. As a device utilizing an electrostatic force, there is a lever type device which includes a cantilever type device and torsion type device. The torsion type device has a torsion bar which extends from the side of a lever for supporting the lever so that the lever displaces utilizing the electrostatic force and a restoring force of torsion of the lever. (see FIG. 6 and FIG. 7)

Such actuators, however, had the following problems. The actuators had very high positioning accuracy, but had a small dynamic range. Because of the small dynamic range, they were able to properly follow surface roughness of the atomic order, whereas it was difficult for the actuators to follow undulation or the like of the substrate, which is macroscopic surface roughness. In addition, there is a possibility to cause contact between the probe and the medium, thus raising problems of occurrence of damages such as a drop in the sensitivity of the probe tip and a decrease in the resolution.

Thus, control is normally carried out using two actuators for coarse movement and fine movement in the conventional apparatus.

In this arrangement, a fine movement mechanism operates for the roughness of the atomic level and a coarse movement mechanism for the relatively great roughness, whereby the probe can trace such great roughness as the undulation of substrate, which could not be covered only by the fine movement mechanism.

As for such control used for observation with STM, Japanese Patent Laid-open Application No. 01-233303 discloses that coarse movement is preferably controlled so that the center of control of fine movement is located at the middle of displacement of the overall fine movement.

The reason is that the roughness configuration can conceivably be captured in more detail in the case of observation of surface configuration when the equal dynamic range is provided in a direction away from the substrate surface.

The conventional control method as disclosed by Japanese Patent Laid-open Application No. 01-233303, however, had the following problem. The conventional control method permitted the probe to trace the pits in the surface configuration, whereas it gave the probe a small movable range in the direction of projections (because the overall movable range was halved between the movable ranges for projections and pits). This resulted in failing to secure a sufficient back amount of the probe for suddenly appearing projections, which caused the probe to happen to touch the projections, thus damaging the probe tip.

The contact or collision often occurs at structures about 10 nm high or more on the surface of the recording medium, for example at portions of grain boundaries etc. between crystals of the medium.

Also, this was a big problem where a crystal metal substrate was used as a substrate of the medium.

In memory systems, a damage on the probe is more serious. If a partial area of the medium were broken, recording and/or reproduction could be carried out by bypassing that area or scattering recording sites as in the case of compact disks presently available. However, the damage on the probe would affect all data to cause errors or incapability of detection unless the probe is cleaned, unless the probe tip is subjected to re-sharpening, or unless the probe is replaced.

Moreover, it is technically difficult to provide a mechanism for recovering the probe, and it is also disadvantageous in respect of the efficiency, taking integration thereof into consideration.

Further, when the electrostatic driving type torsion lever is used as the fine movement mechanism, the restoring force of torsion could not be effectively utilized for retreating the probe in case that the control center is set to the center of the driving range of the fine movement.

SUMMARY OF THE INVENTION

To solve the above problems, an object of the present invention is to provide an information processing apparatus which is arranged to avoid collision of the probe with the medium, thereby preventing deformation of the probe tip and keeping cleanness thereof for a longer period.

The above object can be achieved by an information processing apparatus, which utilizes a physical phenomenon occurring between a probe and a sample to detect information from the sample, comprising:

means for moving the probe in order to adjust a clearance between the probe and the sample;

means for detecting a physical phenomenon occurring between the probe and the sample;

means for generating a control signal for the moving means to change the clearance between the probe and the sample to a desired clearance, based on a result of detection of the detecting means; and means for applying an offset signal to the control signal in order that the probe can move with respect to a reference located at a position deviated from a center position of a movable range of the probe by means of the moving means.

The present invention will be explained in detail with embodiments thereof to follow.

DETAILED DESCRIPTION OF THE PREFERRED EMBODIMENTS

Specific embodiments of the present invention will be explained by reference to the drawings.

Figure 1:
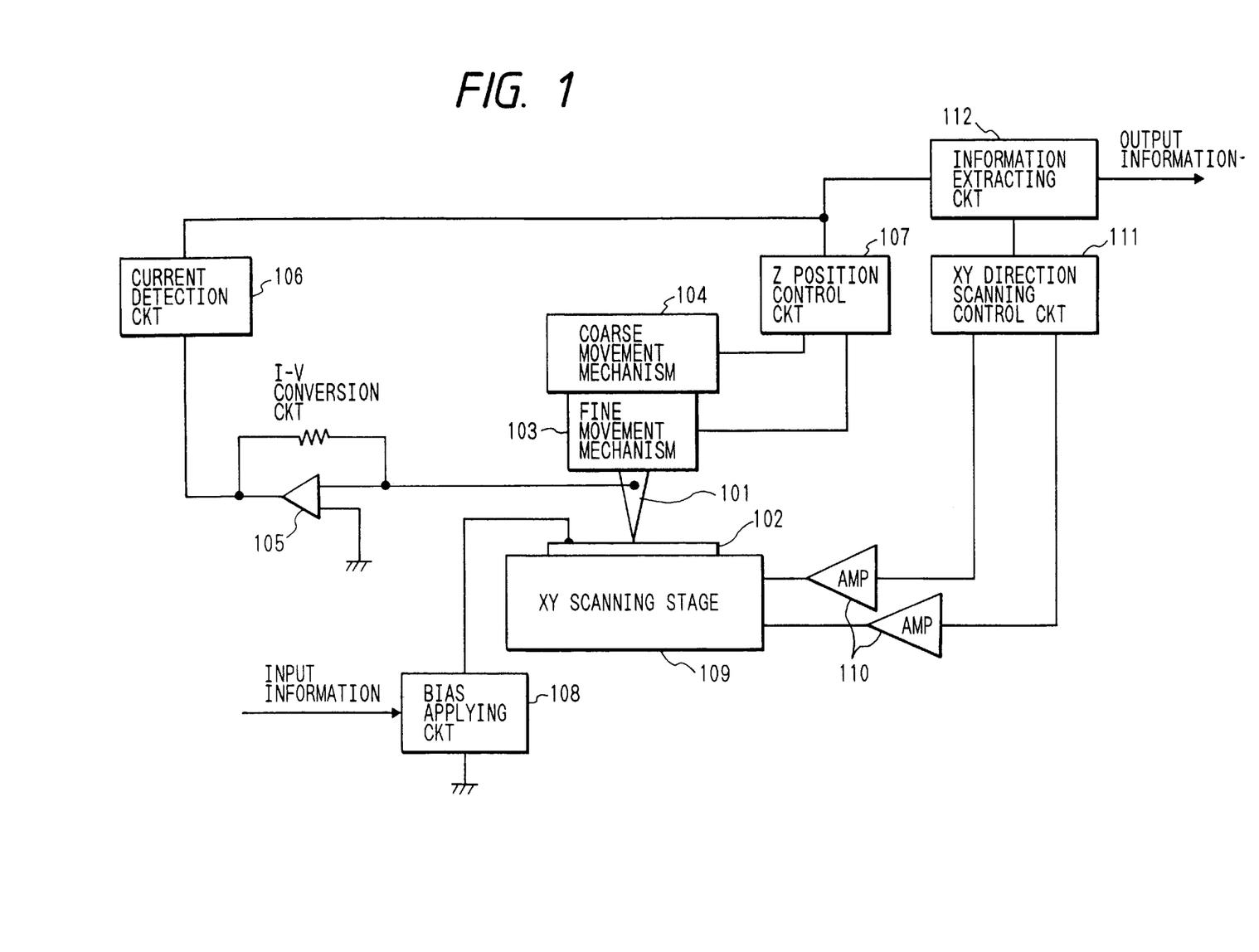
FIG. 1 is a schematic drawing to show the constitution of a memory system in the present invention.

FIG. 1 is a structural drawing to show the basic construction of a memory system according to the present invention.

A probe position control mechanism is composed of a bias applying circuit 108 for applying a voltage between a recording medium 102 mounted on an XY scanning stage and a probe 101, a current detection circuit 106 for detecting a tunneling current flowing in the probe through an I-V conversion circuit 105 upon application of the voltage by the bias applying circuit 108, a Z-position control circuit 107 and an information extracting circuit 112 which receive an output signal of the detected current from the current detecting circuit 106, and a fine movement mechanism 103 and a coarse movement mechanism 104 for drive-controlling the probe in directions perpendicular to the surface of the recording medium, based on a control signal from the position control circuit.

In the embodiments of the present invention, a layer-built piezoelectric device is used as the coarse movement mechanism 104 and a cylinder piezoelectric device as the fine movement mechanism 103, as detailed later. The accuracy is 0.1 angstrom for fine movement and 1 nm for coarse movement, and a maximum displacement amount is 50 nm for fine movement and 5 $\mu$m for coarse movement.

The bias applying circuit 108 converts input information into a bias signal to apply it between the probe and the medium, in addition to the bias for detecting the tunneling current as described above. This bias signal may be a pulse signal, and an example of the recording method is one for writing recording bits by electrically processing the recording medium.

Under the above arrangement, the bias applying circuit 108 applies the predetermined voltage between the probe 101 and the recording medium 102 to generate the tunneling current between the probe 101 and the medium 102, this tunneling current is guided through the I-V conversion circuit 105 to be converted into a voltage signal, and thereafter the current detection circuit 106 measures it as a current value. The current value is sent to the Z-position control circuit 107 and to the information extracting circuit 112. Then the information extracting circuit 112 extracts acoustic data or image data or the like as a digital signal or an analog signal from the current value and stage position information output from an XY-direction scanning control circuit 111 for controlling the position of the XY scanning stage 109.

The Z-position control circuit 107 performs feedback control by a control method of the PID or the like for the distance between the probe 101 and the medium 102 from the current value detected, and the coarse movement mechanism 104 and fine movement mechanism 103 are arranged to perform associated control on that occasion in the present invention. Further, the center position of drive control of the fine movement mechanism is deviated so as to keep a retracting margin of the probe from the medium as large as possible. Then the apparatus is arranged to set the position for example by an offset signal output from an offset generation unit in the present invention.

The details will be explained specifically.

Embodiment 1

Figure 2:
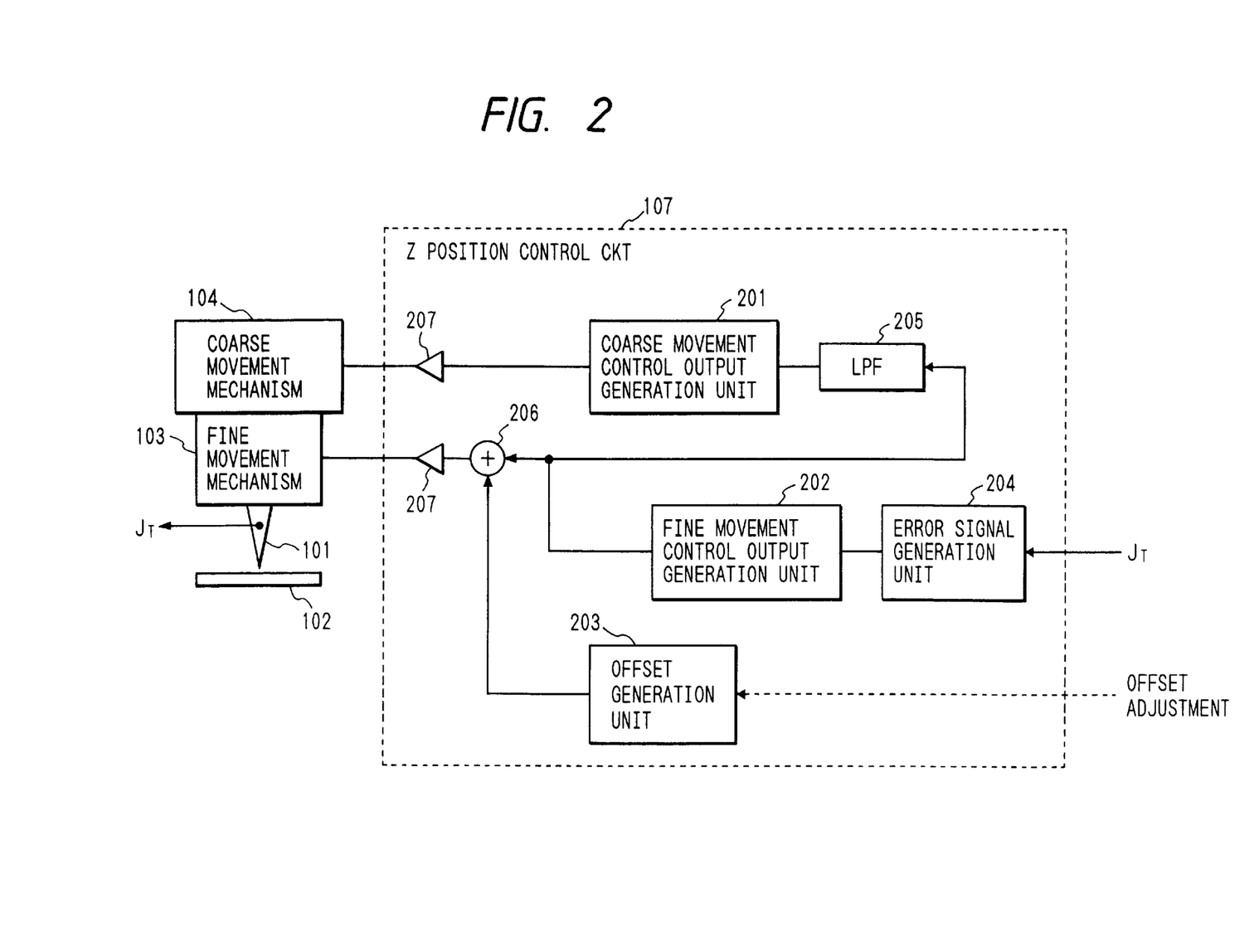
FIG. 2 is a block diagram to illustrate the operation of a Z-position control circuit in Embodiment 1.

FIG. 2 is a block diagram to show the details of the operation of the Z-position control circuit 107 in Embodiment 1.

In the present embodiment, the recording medium was the one as disclosed in Japanese Laid-open Patent Applications No. 63-161552 and No. 63-161553, which was a sample obtained by laying a SOAZ-Langmuir-Blodgett (LB) film (a double-layered film) on an Au electrode.

The Au electrode was an Au evaporated film deposited by resistance heating. Information was electrically written in this medium by applying a bias voltage, on which a continuous pulse voltage with crest values of −6 V and +1.5 V was superimposed, between the sample and the probe, using the probe 101. Digital data was recorded as bit information.

A value of the tunneling current flowing from the recording medium 102 through the probe 101 is input as signal Jt into an error signal generation unit 204. The error signal generation unit 204 generates a difference signal between a predetermined reference current value and the detected current value, and calculates how far the probe deviates from the distance between the probe and the recording medium as defined by the reference current value to output a signal about the deviation.

This error signal output is then input into a fine movement control output generation unit 202, which calculates a control amount of the fine movement mechanism 103 according to the magnitude of the signal, based on the PID control, and outputs the control amount calculated. The control amount output is let to pass through a low-pass filter (LPF) 205 to extract a low-frequency component (due to undulation or inclination of the medium, creep of the piezoelectric body, etc.). The low-frequency component thus extracted is input into a coarse movement control output generation unit 201, which drives the coarse movement mechanism 104 in accordance with a value of the component.

Further, the control amount output from the fine movement control output generation unit 202 is also added to an offset value generated by an offset generation unit 203, which is characteristic in the present invention, in an adder 206 to drive the fine movement mechanism 103 through an amplifier 207.

Here the offset value generated by the offset generation unit 203 is adjusted by an offset adjustment signal given from the outside by a user.

Amplifiers 207 are arranged to give such outputs as to be limited at limit voltages of the respective actuators.

Specifically, the present embodiment is arranged so that the amplifier for driving the fine movement mechanism 103 is arranged between ±50 V and the amplifier for driving the coarse movement mechanism 104 between 0 and 100 V, thereby preventing the actuators from being broken with application of a voltage outside the ranges to the actuators.

Even if the offset value takes any value, only a voltage within the range of ±50 V is applied to the fine movement mechanism 103 accordingly.

The addition of offset herein means deviation of the drive center of the fine movement mechanism. In other words, the fine movement mechanism will move the probe with respect to the reference located at a position deviated from the center of the overall movable range of the probe by the mechanism.

Since the coarse movement mechanism takes charge of a displacement of DC component, the fine movement mechanism takes charge of only an AC component, as functioning to bring the drive center of the AC component to a position proximal to the medium.

Namely, with an offset of 0, the drive center is at 0 V, which is the middle of the drive voltage range of ±50 V, and a margin for retracting the probe can be increased by setting the drive position closer to the medium than the middle position.

The present embodiment employs the cylinder type piezoelectric device as the fine movement mechanism, and the movable range is 50 nm. In this embodiment, four kinds of offsets were set and tests for the respective case were conducted. Offsets of the respective cases were set such that 85%, 70%, 55% and 30% of the whole driving range were respectively set in a direction away from a medium while the remaining 15%, 30%, 45% and 70% of the whole driving range were respectively set in a direction toward the medium. The results of the respective cases are shown in the following table.

| Direction toward Medium | 15% | 30% | 45% | 70% |
| --- | --- | --- | --- | --- |
| Direction away from Medium | 85% | 70% | 55% | 30% |
| Evaluation | ◉ | ○ | Δ | x |

Mark ◉ indicates that no damage was observed in the tip of the probe. Mark ○ indicates that although a damage was somewhat observed in the tip of the probe, there is almost no problem for recording and reproduction. Mark Δ indicates that deterioration of the detection signal was caused due to a damage to thereby adversely affect the reproduction data. Mark x indicates that reproduction was impossible in the course of reproduction due to a damage of the probe.

There is found from the results that a damage of the probe due to collision could be effectively prevented in the case of setting the offset such that 45% or less of the whole driving range was set in the direction toward the medium. Further, it is found from the results that although some effects are obtained for recording and reproduction in the case of setting the offset such that 50% or less of the whole driving range was set in the direction toward the medium, it is preferable to set the offset such that 30% or less of the whole driving range was set in the direction toward the medium, so that bits for error correction can be lessened and information recording density can be improved. Further, it is found from the results that not only reliability of reproduction of information can be improved but also life of the probe can be improved since no damage was observed in the probe in the case of setting the offset such that 15% of the whole driving range was set in the direction toward the medium.

The present embodiment achieved the above results when the evaporated film of Au by resistance heat was used as the substrate of the recording medium, but it should be noted that the offset value needs to be adjusted with use of different substrates. For example, if the substrate is one obtained by epitaxially growing Au, there are certainly boundaries between crystal domains, but the surface roughness within one domain is just some angstroms (which is the size of atomic step level). Thus, the offset value does not have to be determined at the above ratio of 15% and 85%, but the above effect is considered to be further enhanced by setting the ratio to 5%:95%.

In the cases where the substrate has greater surface roughness than the Au evaporated film used in the present embodiment, the ratio can be adjusted in accordance with the substrate, for example to 30%:70%.

In either case, the distance for retracting the probe can be increased by giving some offset according to the surface conditions of the medium used in order to bring the center of position control of the probe to a position closer to the medium.

Embodiment 2

Figure 3:
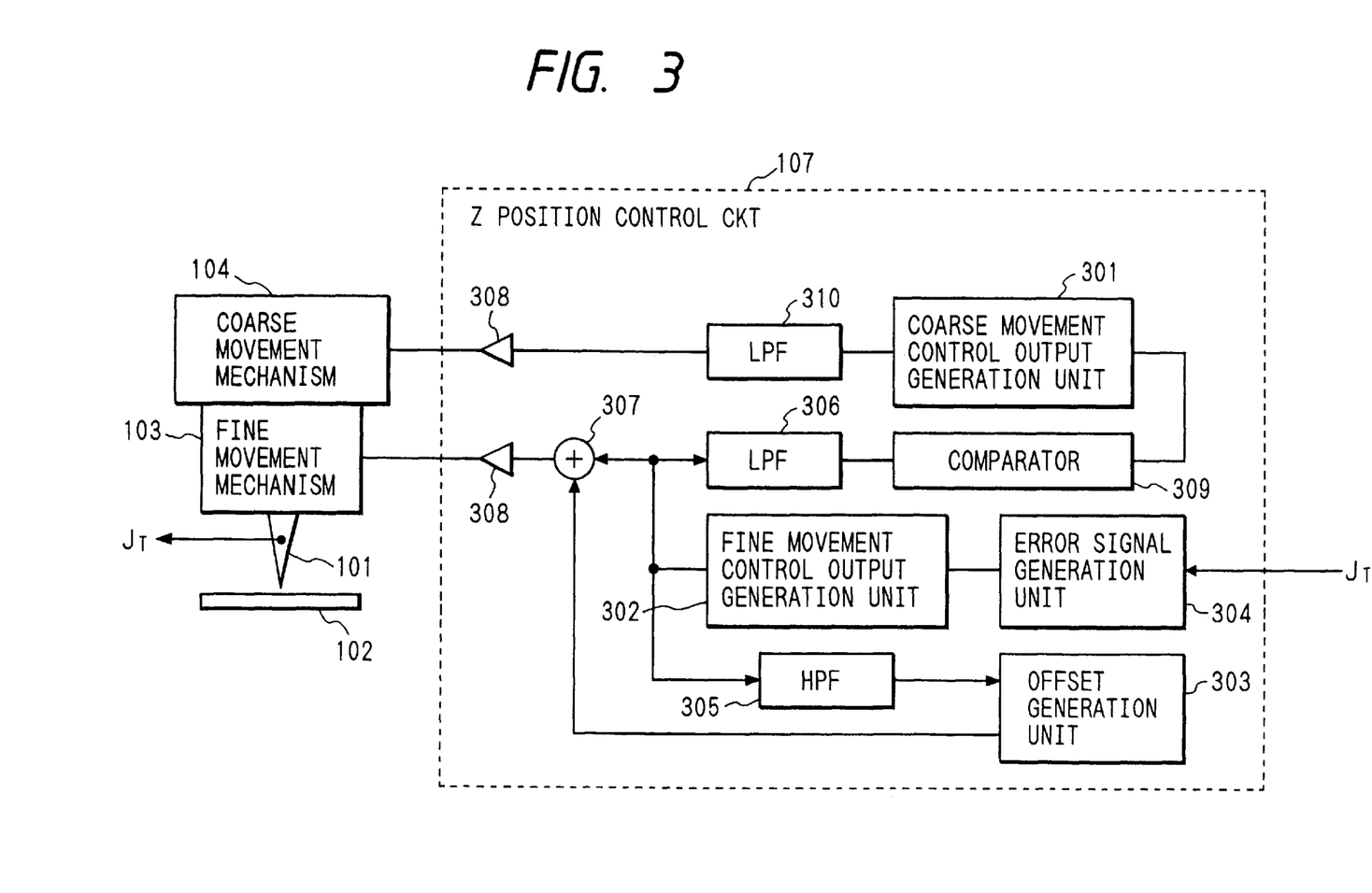
FIG. 3 is a block diagram to illustrate the operation of a Z-position control circuit in Embodiment 2.

FIG. 3 is a schematic drawing of Embodiment 2 of the present invention.

The basic arrangement of adding the offset is the same as that in Embodiment 1, but the present embodiment is characterized by automated adjustment of offset.

The operation of the Z-position control circuit 107 of the present embodiment is next explained.

The tunneling current Jt flowing between the probe 101 and the recording medium 102 is input into the error signal generation unit 304.

Receiving the tunneling current signal Jt thus input, the error signal generation unit 304 generates a difference signal thereof from the predetermined reference current value, and calculates how far the probe deviates from the distance between the probe and the recording medium as defined by the reference current value to output a signal of the deviation. An error signal of the deviation amount is input into a fine movement control output generation unit 302 to be converted into an actual control amount. On this occasion the PID control is used in the present embodiment.

Next, this control amount signal is sent through three ways. First, the signal passes through a low-pass filter (LPF) 306 and then is compared with a setting value in a comparator 309. According to a result of the comparison, a signal is sent to the coarse movement control output generation unit 301, and the coarse movement control output generation unit 301 drives the coarse movement mechanism 104 through the LPF 310 and amplifier 308. The LPF 310 is provided for converting stepped changes of a drive signal output from the coarse movement control output generation unit into slower changes by a predetermined time constant.

Further, the control signal output from the fine movement control output generation unit 302 also passes through a high-pass filter (HPF) 305 to be converted into a signal of only AC component and then the signal is input into the offset generation unit 303.

The offset generation unit 303 determines an offset value from the magnitude of the AC component. The setting value in the present embodiment is automatically set at an addition of the minimum resolution (0.5 nm) of the coarse movement mechanism 104 to a displacement width of the AC component measured.

The offset value output is added to the control amount generated by the fine movement control output generation unit 302 in an adder 307 in the same manner as in Embodiment 1, and a resultant signal is applied as a drive signal to the fine movement mechanism 103 through an amplifier 308.

Here, the amplifier 308 has the same mechanism as in Embodiment 1.

Figure 4:
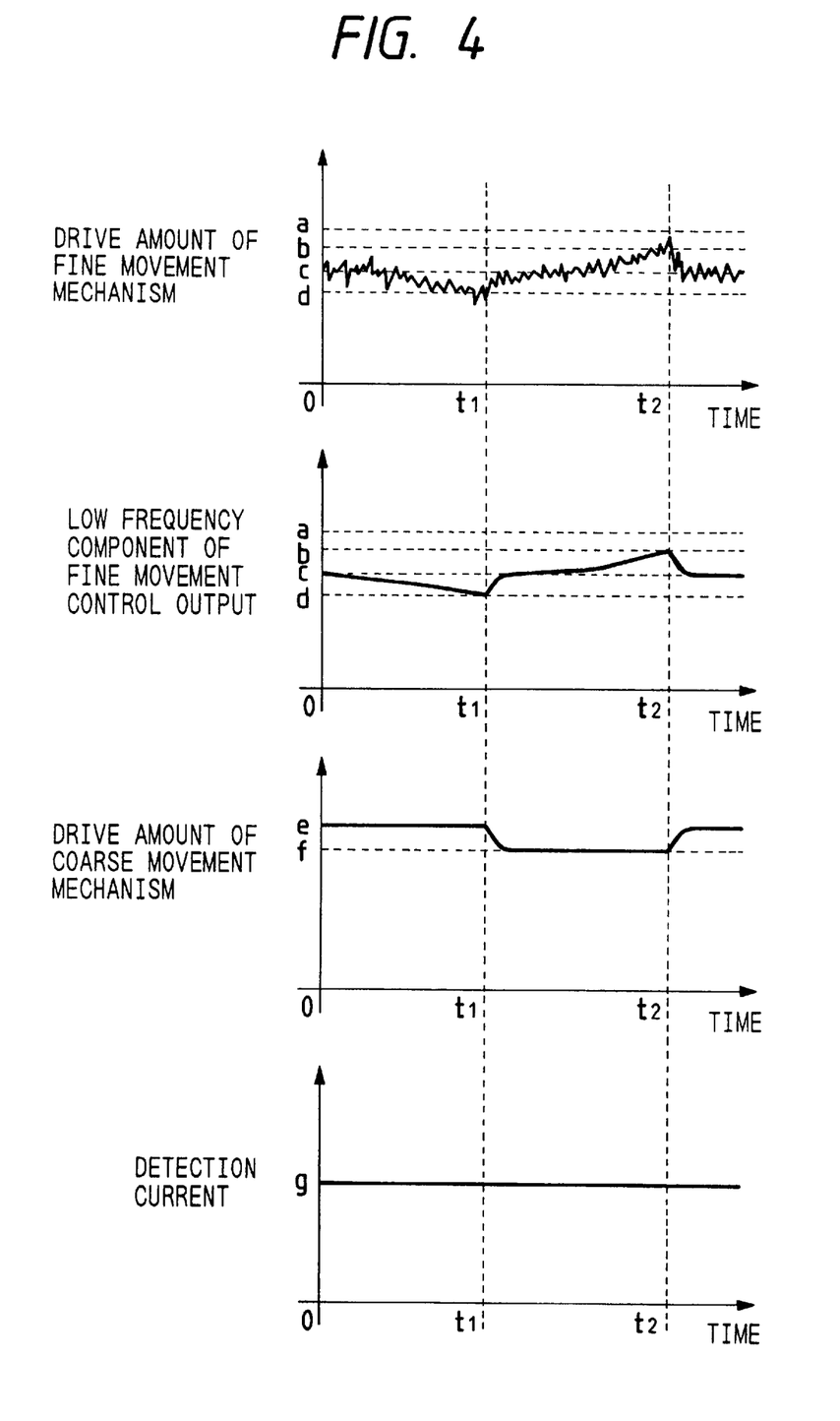
FIG. 4 is a diagram to show signal waveforms for illustrating the associated operation of a coarse movement mechanism and a fine movement mechanism in Embodiment 2.
Figure 5:
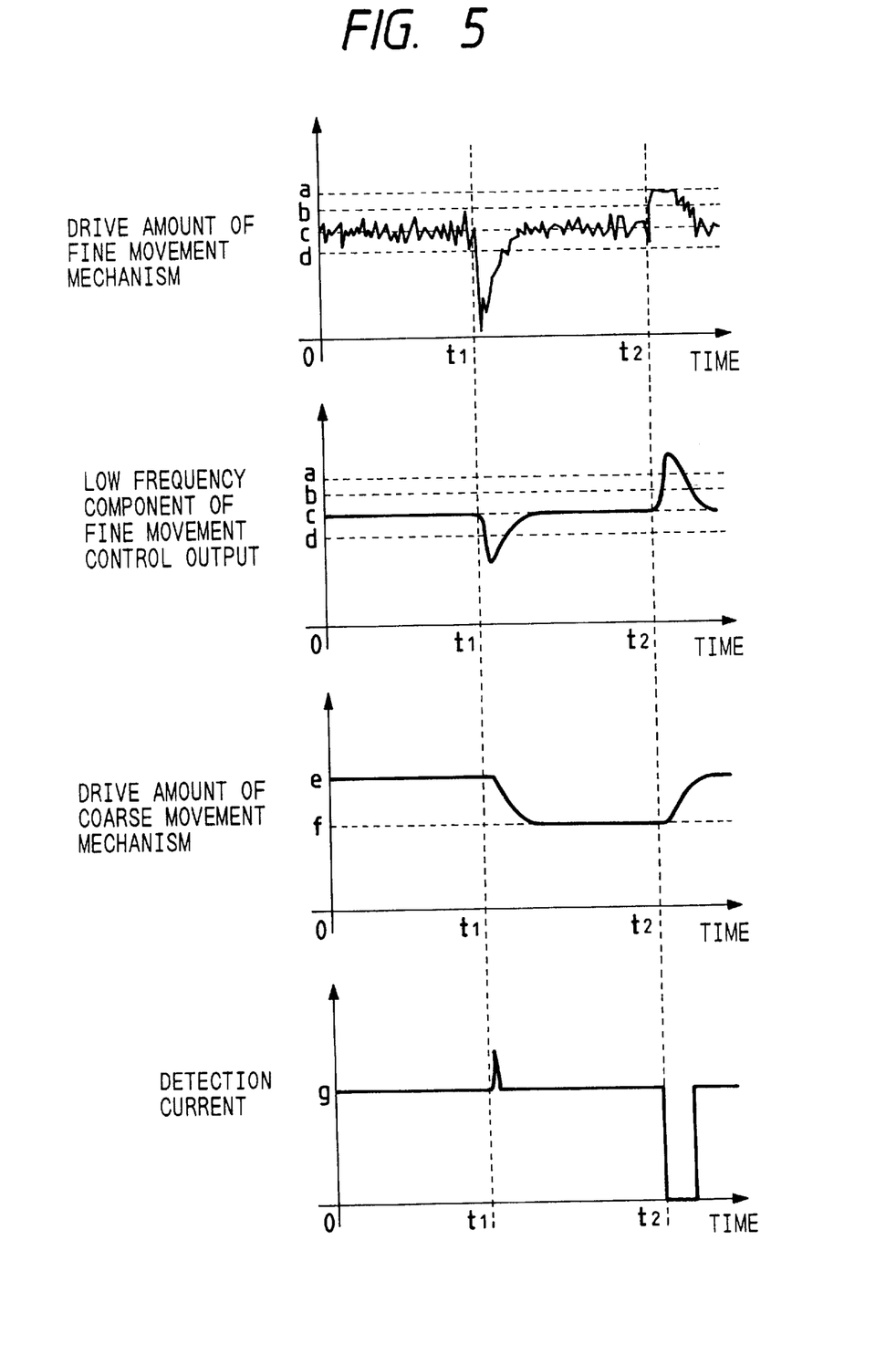
FIG. 5 is a diagram to show signal waveforms for illustrating the associated operation of the coarse movement and fine movement structures when there is a large structure in Embodiment 2.

Next explained referring to FIG. 4 and FIG. 5 is the associated operation of the coarse movement mechanism and the fine movement mechanism in Embodiment 2.

FIG. 4 shows relations among drive amount of the fine movement mechanism, drive amount of the coarse movement mechanism, current value, etc. when the distance between the probe and the medium gradually decreases because of inclination of the medium or the like from 0 to t1 with the reference (0) at a certain time and when the distance gradually increases from t1 to t2. In the drawing, c represents the offset value set by the offset generation unit. Distances between bc and between dc each are arranged to be one step (0.5 nm) of the coarse movement mechanism, which is the same distance between ef. Further, the distance between ab is the displacement width of the high-frequency component of the drive amount of the fine movement mechanism.

As the drive amount of the fine movement mechanism gradually decreases, the low-frequency component thereof comes to be lower than d. At that moment the comparator 309 outputs a signal to lower the drive amount by one step to the coarse movement control output generation unit 301, thereby making the displacement of the coarse movement mechanism 104 one step smaller. This step operation is slowed down by the LPF so as to be sufficiently slower than the operation speed of the fine movement mechanism, so that no change in the current can be observed.

Conversely, during the duration of from t1 to t2, the displacement amount of the fine movement mechanism gradually increases, and when the low-frequency component comes to be greater than b, the comparator 309 outputs a signal to increase the control amount by one step to the coarse movement control output generation unit 301.

As a result, the displacement amount of the coarse movement mechanism becomes one step greater, and the fine movement mechanism is also controlled in response thereto. No change in the current is not observed in this case, either.

Further explained referring to FIG. 5 is a case where large structural changes appear.

When a large ascending step appears at t1, first the fine movement mechanism 103 quickly pulls the probe up.

In this case, a small current flows in a spiked form, but there occurs no collision of the probe with the medium. The low-frequency component of the fine movement control output starts changing with a slight delay after that and goes down below d, which causes displacement of the coarse movement mechanism. In this case, because a change amount of the low-frequency component is just the double of the distance between cd, the comparator gives a command to drive the coarse movement mechanism by two steps.

As a result, ef in FIG. 5 became doubled from ef in FIG. 4. This returns the AC drive center of the fine movement mechanism to the vicinity of the position of c.

Next shown at t2 is a case where a large descending step is present. In this case, the drive amount of the fine movement mechanism becomes saturated at a because it cannot exceed a. However, because the fine movement control output generation unit 302 continues calculating the deviation amount, the low-frequency component of the fine movement control output is continuously input into the comparator without saturating at a.

Determining that the displace amount is two steps, the comparator gives a command to displace the coarse movement mechanism by two steps to the coarse movement control output generation unit 301.

This makes the drive amount of the coarse movement mechanism equal to the displacement of ef distance as shown in FIG. 5. In this case, however, because the drive amount of the fine movement mechanism has been saturated at the position of a, the distance between the probe and the medium cannot be maintained, and therefore, the current value suddenly drops at this point.

Although such a drop in the current value could be a problem in surface observation with STM, the memory system can be properly used for example by preliminarily avoiding such sites upon writing or by effecting error correction, etc.

Recording and reproducing tests were conducted using the memory system as described above, and it was confirmed that durability of the probe was improved several times similarly as in Embodiment 1, as compared with the conventional cases.

Embodiment 3

In this embodiment, an electrostatic driving torsion lever is used as the fine movement mechanism.

Figure 6:
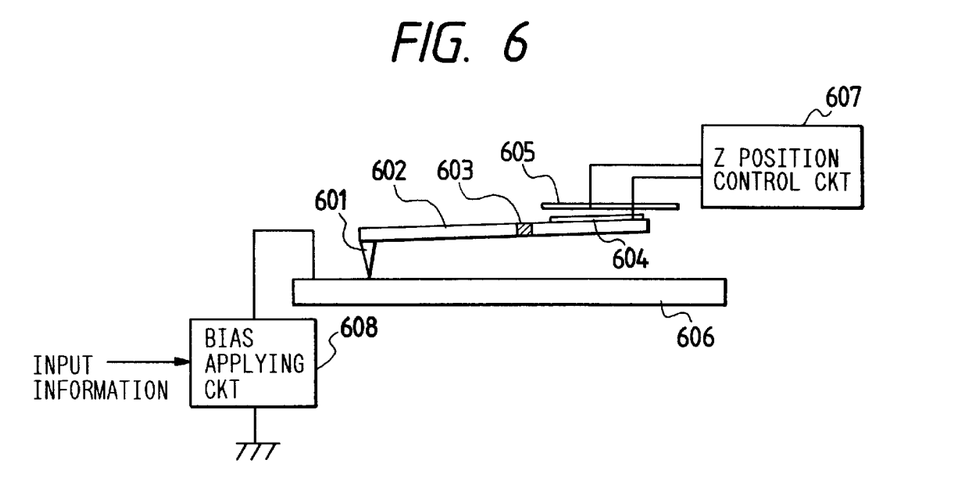
FIG. 6 is a schematic drawing of a structure according to the invention when the electrostatic driving type torsion lever is used as the fine movement mechanism.

FIG. 6 is a schematic drawing showing a structure in which an electrostatic driving torsion lever is used as the fine movement mechanism in the circuit shown in FIG. 1. Portions not shown in FIG. 6 are same as those of FIG. 1. A probe 601 is arranged on a lever 602 which is supported by a torsion bar 603.

When a bias is applied between a drive electrode 604 on the lever and a drive electrode 605 on a supporting base by a Z position control circuit 607, an electrostatic attraction is caused therebetween so that the lever is displaced. Reference numeral 606 designates an electrode provided on the recording medium side. Reference numeral 608 designates a bias applying circuit for applying a bias for reading or writing between a probe 601 and a medium substrate 606.

Figure 7:
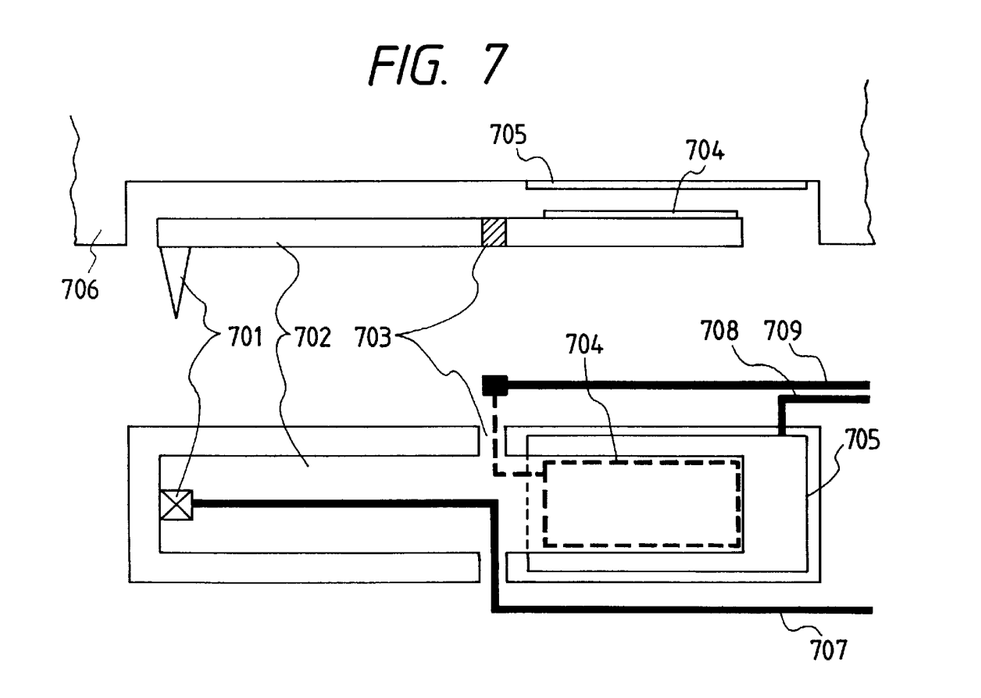
FIG. 7 is a schematic drawing of an electrostatic driving type torsion lever.

FIG. 7 shows schematic cross sectional view and plain view of the probe which was actually produced by the semiconductor process. In FIG. 7, the upper view is a view to see the lever in parallel with the supporting base surface while the lower view is a view to see the lever toward the supporting base surface. Members or elements 701 to 705 in FIG. 7 respectively correspond to those 601 to 605 shown in FIG. 6. Reference numeral 706 designates the supporting base, 707 a wiring for current detection, 708 a wiring for drive voltage applied to the drive electrode provided at the supporting base side and 709 a wiring for drive voltage applied to the drive electrode provided at the lever side. The wiring 709 for drive voltage application is wired from the back side (broken line) of the lever toward the front side (solid line) of the lever. The typical torsion type lever shown in FIG. 6 is driven by an attraction between the electrodes and a restoring force of torsion of the torsion bar. The lever is returned to a point where no force acts (neutral point) by only restoring force of the torsion bar. For this reason, the return to the neutral point is quickly performed by a larger force as the displacement amount from the neutral point is made larger. Time required to return to the neutral point depends on a resonant frequency of the lever. On the other hand, the returning speed of the lever becomes higher as an amount previously displaced is made larger. By utilizing this phenomenon, the probe can be retreated from a large projecting structure existing in the medium substrate. In this embodiment, the electrostatic driving torsion lever is used as the fine movement mechanism as shown in FIG. 6 (coarse movement mechanism is not shown), and the offset automatic adjusting system is used similarly as in the embodiment 2.

Recording and reproducing tests were conducted using the above memory system. As a result, the durability of the probe can be improved several times that of the conventional one, similarly as in the embodiment 2.

Since the present invention involves such an arrangement that the drive control center of the drive mechanism is deviated as described above so as to keep a retracting or retreating margin of the probe from the medium as large as possible with necessity, as described above, collision can be avoided between the probe and the medium, and the probe tip can be prevented from being deformed, whereby cleanness of the probe tip can be kept for a period much longer than that in the conventional cases. With the effects, time and work for exchange of probe can be decreased, and consumption of the probe itself can also be decreased, thereby greatly reducing the running cost of the memory system.

Further, since the both fine movement mechanism and coarse movement mechanism are arranged so as to operate in an associated manner in the present invention, they can be sufficiently ready for grooves in sizes of some nm due to grain boundaries between crystals, where the state of substrate electrode is not super-flat, differences in crystal heights between grains, etc.

When the system according to the invention is used for the probe of the electrostatic driving torsion lever, a large restoring force can be obtained by an offset displacement being given beforehand and the lever control being performed. Therefore, the speed for retreating the lever can be made higher, so that an action to retreat the probe can be performed with a high speed even in case of fluctuation of crystal height among crystal grains or grooves.

Further, it is easy to apply to a plurality kinds of substrates by measuring a surface roughness (projection and recess) locally and adjusting an offset amount to be previously given.

The embodiments as described above were explained as systems using the tunneling current, but the present invention can also effectively be applied to systems using a physical amount other than the tunneling current, for example those using evanescent light or the like.

What is claimed is:

1. An information processing apparatus, which utilizes a physical phenomenon occurring between a probe and a sample to detect information from the sample, comprising:

moving means for moving said probe in order to adjust a clearance between said probe and the sample;

detecting means for detecting a physical phenomenon occurring between said probe and the sample and outputting a detection signal;

means for generating a differential signal from the detection signal output by said detecting means and a reference value, as a control signal for said moving means; and means for applying an offset signal to said control signal in order that said probe can move with respect to a reference position within a movable range of said probe, said reference position being deviated from a center position of the movable range toward the sample.

2. The information processing apparatus according to claim 1, wherein said physical phenomenon is a tunneling current.

3. The information processing apparatus according to claim 1, wherein said physical phenomenon is evanescent light.

4. The information processing apparatus according to claim 1, further comprising:

means for extracting a low-frequency component of said control signal; and coarse movement means for moving said moving means in directions perpendicular to the sample, based on said low-frequency component.

5. The information processing apparatus according to claim 1, wherein said moving means comprises an electrostatic driving type torsion lever.

6. An information processing apparatus which utilizes a physical phenomenon occurring between a probe and a sample to detect information from the sample, comprising:

means for moving said probe in order to adjust a clearance between said probe and the sample;

means for detecting a physical phenomenon occurring between said probe and the sample;

means for generating a control signal for said moving means to change the clearance between said probe and the sample to a desired clearance, based on a result of detection of said detecting means; and means for applying an offset signal to said control signal in order that said probe can move with respect to a reference located at a position deviated from a center position of a movable range of said probe by means of said moving means toward the sample, wherein said offset signal applying means comprises means for extracting a high-frequency component of said control signal and means for generating said offset signal, based on said high-frequency component.

7. An information processing apparatus for detecting information from a sample, comprising:

an adjustable support mechanism;

a probe supported by said adjustable support mechanism;

a movement control circuit electrically connected to said adjustable support mechanism;

a detector circuit;

a conversion circuit electrically connected to said detector circuit which outputs a detection signal based on a physical phenomenon occurring between said probe and the sample detected by said detector circuit;

an error circuit electrically connected to said conversion circuit which generates a control signal based on the difference between the detection signal and a reference value; and an adding circuit electrically connected to said error circuit which adds an offset signal to the control signal to form an output signal, wherein the output signal is provided to said control circuit so that said probe can move with respect to a reference position within a movable range of said probe, the reference position being deviated from a center position of the movable range toward the sample.

8. The information processing apparatus according to claim 7, wherein said detector circuit detects a tunneling current.

9. The information processing apparatus according to claim 7, wherein said detector circuit detects evanescent light.

10. The information processing apparatus according to claim 7, further comprising:

a low-pass filter electrically connected to said error circuit, and wherein said adjustable support mechanism includes a coarse movement mechanism which allows said probe to move in directions perpendicular to the sample, based on an output from said low-pass filter.

11. The information processing apparatus according to claim 7, further comprising:

a high-pass filter electrically connected to said error circuit; and a generator circuit which generates the offset signal based on an output from said high-pass filter.

12. The information processing apparatus according to claim 7, wherein said adjustable support mechanism comprises an electrostatic driving type torsion lever.

* * * * *